United States Patent [19]
Nayak et al.

[11] Patent Number: 5,191,492
[45] Date of Patent: Mar. 2, 1993

[54] MECHANISMS FOR A CLOSED LOOP HEAD POSITIONER FOR STREAMING TAPE DRIVES

[75] Inventors: Ashok B. Nayak, La Verne; Donald Schilling, Anaheim, both of Calif.

[73] Assignee: Archive Corporation, Costa Mesa, Calif.

[21] Appl. No.: 931,110

[22] Filed: Aug. 17, 1992

Related U.S. Application Data

[63] Continuation of Ser. No. 502,262, Mar. 30, 1990, abandoned.

[51] Int. Cl.$^5$ .......................... G11B 5/55; G11B 5/584
[52] U.S. Cl. ................................ 360/78.02; 360/77.12
[58] Field of Search ............... 360/77.01, 77.12, 77.16, 360/78.01–78.04, 105–107, 109, 76

[56] References Cited

U.S. PATENT DOCUMENTS

| | | | |
|---|---|---|---|
| 3,526,726 | 9/1970 | Corbett et al. | 360/109 |
| 3,575,422 | 4/1971 | Peltz et al. | 360/78.02 |
| 4,165,523 | 8/1979 | Hathaway | 360/77.16 |
| 4,451,862 | 5/1984 | Rijckaert et al. | 360/109 |
| 4,583,135 | 4/1986 | Kimura | 360/77.01 |
| 4,623,947 | 11/1986 | Kasahara | 360/109 |

*Primary Examiner*—Jerry Smith
*Assistant Examiner*—Steven R. Garland
*Attorney, Agent, or Firm*—Roberts and Quiogue

[57] ABSTRACT

Tape head positioning apparatus that includes a head carriage frame and a parallel beam positioning structure supported by the head carriage for supporting the magnetic tape head and for variably positioning the magnetic tape head relative to the carriage along a path generally transverse to the tape travel direction. The parallel beam positioning structure includes parallel support beams secured at their ends to the head carriage. The magnetic tape head is secured between the bender beam at a location generally between their ends. In a particular embodiment of the parallel beam positioning apparatus, the parallel support beams comprise first and second resilient reed beams having their ends secured to the head carriage and configured to be deflectable in a direction transverse to the tape travel direction. A voice coil linear motor deflects the reed beams pursuant to a control signal to move the magnetic tape head along the path transverse to the tape travel direction. In a further embodiment of the parallel beam positioning apparatus, the support beams comprise first and second parallel piezoelectric bender beams having their ends secured to the head carriage and configured to deflect in a direction transverse to the tape travel direction in response to a control signal. Deflection of the bender beams pursuant to the control signal displaces the magnetic tape head along the path transverse to the tape travel direction.

2 Claims, 3 Drawing Sheets

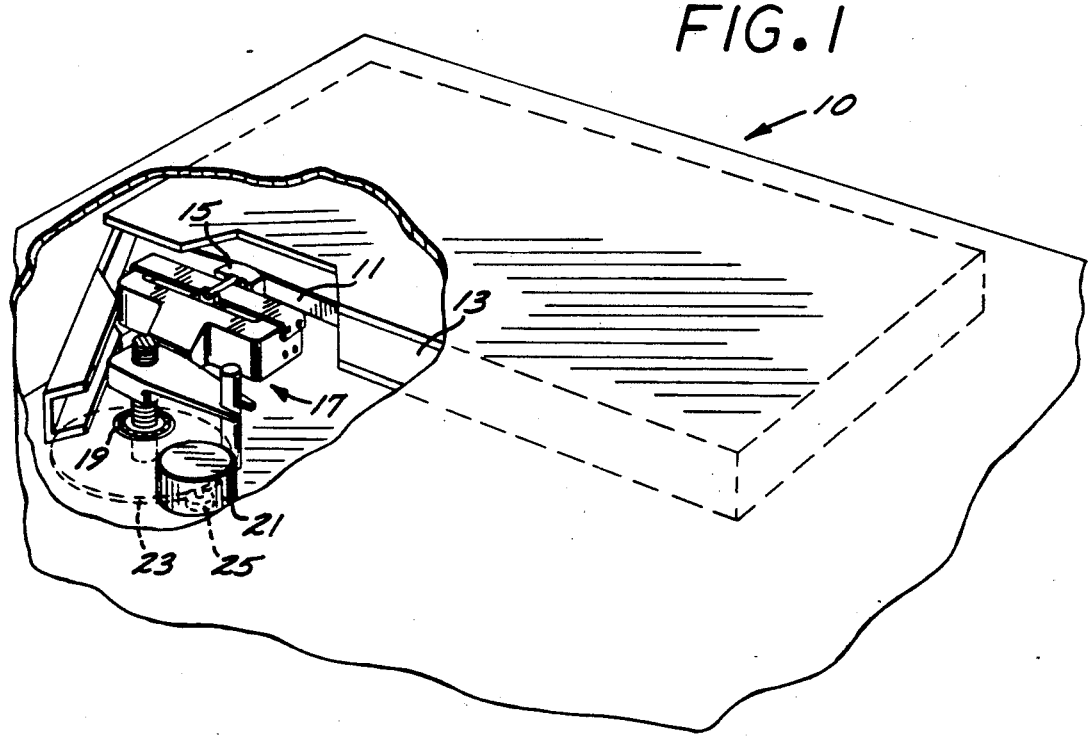
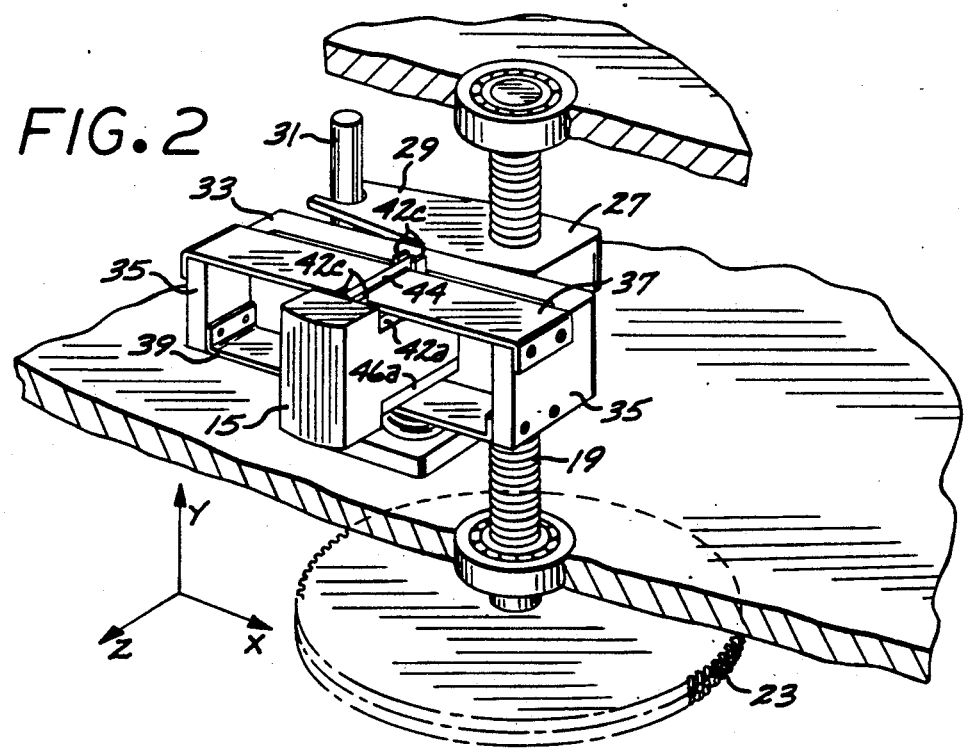

MECHANISMS FOR A CLOSED LOOP HEAD POSITIONER FOR STREAMING TAPE DRIVES

This is a continuation of copending applications Ser. No. 07/502,262 filed on Mar. 30, 1990, now abandoned.

BACKGROUND OF THE INVENTION

The present invention relates generally to tape drives, and more particularly to magnetic tape head positioning apparatus that provides fine positioning of a magnetic tape head in a closed loop magnetic tape head positioning system.

Tape drives are commonly utilized as secondary storage devices for back up of the primary storage devices such as disk drives utilized in large computers such as main frames and in small computers such as personal computers. For small computers, tape drives using quarter-inch tape cartridges (i.e., the width of the tape is nominally one-quarter inch) are widely utilized, since they are relatively small and provide sufficient storage capacities.

An important factor that determines the storage capacity of a tape utilized with a non-rotating magnetic tape head is number of parallel, longitudinally oriented tracks utilized to record data. In other words, all other factors being the same, more tracks provide more storage capacity. The writing and reading of parallel tracks is achieved by magnetic tape head positioning apparatus for positioning the magnetic tape head at different locations in the transverse direction relative to the tape and its direction of travel.

Typically, the magnetic tape head positioning apparatus includes a stepper motor, an externally threaded lead screw driven by the stepper motor, and a head carriage assembly which supports the magnetic tape head and is driven by the lead screw along a path transverse to the tape travel direction. For writing, each track is defined by positioning the magnetic tape head at a location as determined by the calibration of the particular tape drive for unformatted tapes, or as close to the center of a track as defined by servo information in a pre-formatted tape. In either event, the magnetic tape head would be positioned at one of the incremental locations defined by the stepper motor. Due to manufacturing variations in the tape drive and the tape cartridge, the magnetic tape head might not be positioned at the location that corresponds to the center of a particular track.

The consequences of imprecise magnetic tape head positioning include distortion and low signal amplitude upon playback on a drive different from the one that wrote a tape, or even the inability to read a tape written by another drive. Further, magnetic tape head positioning apparatus that is not capable of precise head positioning places limitations on track density.

SUMMARY OF THE INVENTION

It would therefore be an advantage to provide magnetic tape head positioning apparatus that is capable of very precise magnetic tape head positioning.

Another advantage would be to provide magnetic tape head positioning apparatus having greater positioning precision than increments of a stepper motor.

The foregoing and other advantages are provided by the invention in a magnetic tape head positioning apparatus that includes a head carriage frame and a parallel beam positioning structure supported by the head carriage for supporting the magnetic tape head and for variably positioning the magnetic tape head relative to the carriage along a path generally transverse to the tape travel direction. The parallel beam positioning structure includes parallel support beams secured at their ends to the head carriage.

In a particular embodiment of the magnetic tape head positioning apparatus, the parallel beam positioning apparatus includes first and second parallel piezoelectric bender beams having their ends secured to the head carriage and configured to deflect in a direction transverse to the tape travel direction in response to a control signal. The magnetic tape head is secured between the bender beams at a location generally between their ends, and deflection of the bender beams pursuant to the control signal displaces the magnetic tape head along the path transverse to the tape travel direction.

In a further embodiment of the magnetic tape head positioning apparatus, the parallel beam positioning apparatus includes first and second resilient reed beams having their ends secured to the head carriage and configured to be deflectable in a direction transverse to the tape travel direction. The magnetic tape head is secured between the reed beams at a location generally between their ends, and a voice coil linear motor deflects the reed beams pursuant to a control signal to move the magnetic tape head along the path transverse to the tape travel direction.

BRIEF DESCRIPTION OF THE DRAWING

The advantages and features of the disclosed invention will readily be appreciated by persons skilled in the art from the following detailed description when read in conjunction with the drawing wherein:

FIG. 1 is a partial cutaway perspective view of a tape drive which includes the magnetic tape head positioning apparatus of the invention.

FIG. 2 is a perspective view of the present magnetic tape head positioning apparatus.

DETAILED DESCRIPTION OF THE DISCLOSURE

Figure 3:
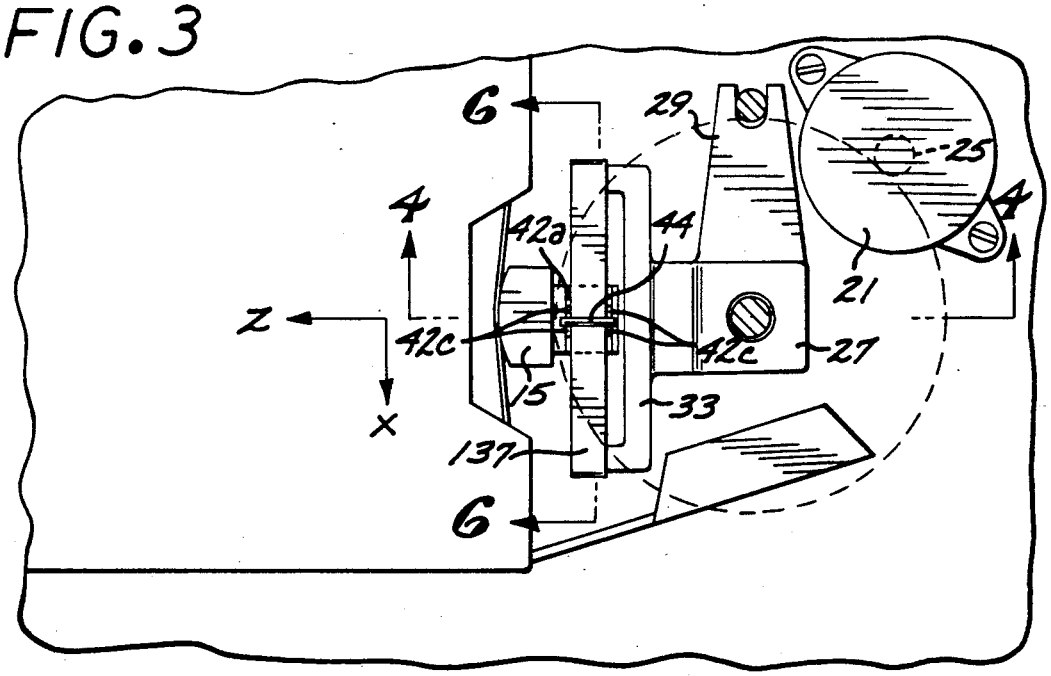
FIG. 3 a top view of the present magnetic tape head positioning apparatus.

In the following detailed description and in the several figures of the drawing, like elements are identified with like reference numerals.

FIG. 1 illustrates a tape drive 10 which is utilized to write and read a magnetic tape 11 stored in a tape cartridge 13. A magnetic tape head 15 engages the tape 11 which is moved across the face of the head for writing data to the tape and for reading data from the tape. The magnetic tape head 15 is supported by a head carriage 17 that is moved transversely across the tape by rotation of a lead screw 19. The lead screw 19 is rotated by a stepper motor 21 via a pinion gear 25 that is fixed to the output shaft of the stepper motor and engaged with an anti-backlash gear 23 that is fixed to the lead screw 19.

The lead screw is 19 supported by bearings secured to the drive frame, and the stepper motor is also secured to the drive frame, so as to provide for a rigid and fixed relation between the lead screw and the stepper motor output shaft.

Figure 4:
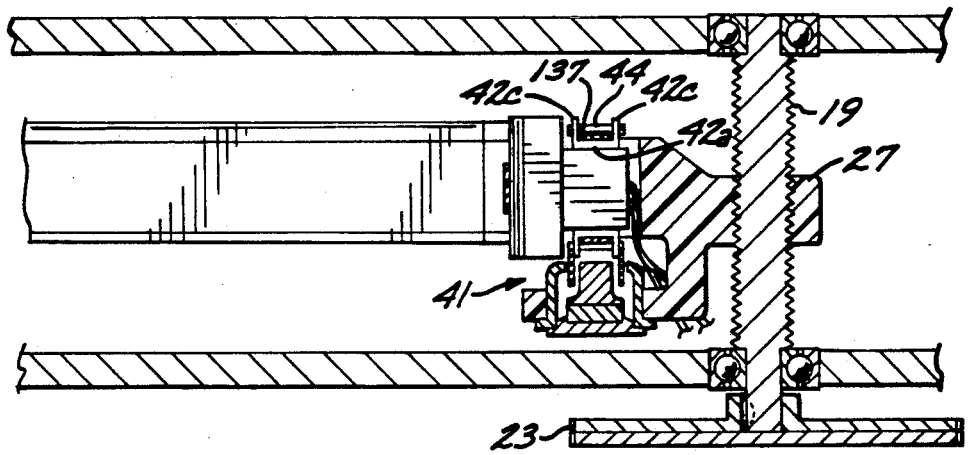
FIG. 4 is a side view of a particular embodiment of the present magnetic tape head positioning apparatus.

Referring more particularly to FIGS. 2, 3, and 4, the head carriage 17 includes a base section 27 which includes an internally threaded aperture for engaging the lead screw 19. A laterally extending anti-rotation arm 29 integral with the base section 27 includes an aperture or slot which engages an anti-rotation shaft 31 mounted in the drive frame. The engagement of the anti-rotation arm 29 on the anti-rotation shaft 31 prevents rotation of the head carriage 17 while permitting displacement thereof transversely to the tape travel direction pursuant to the rotation of the lead screw. For convenience, the direction of tape travel is indicated by an X axis, while the transverse direction in which the magnetic tape head travels is indicated by a Y axis that is perpendicular to the X axis.

The carriage 17 further includes a laterally extending support arm 33 that includes at the ends thereof opposing support blocks 35 spaced from each other and generally aligned along the direction of tape travel.

In accordance with the invention, the magnetic tape head 15 is secured to the head carriage 17 with magnetic tape head positioning apparatus that moves the magnetic tape head relative to the head carriage transversely to the tape travel direction in the Y axis direction. The head positioning apparatus includes a first support beam 37 which has its ends secured to the top portions of the support blocks 35 of the head carriage, and a second support 39 beam parallel to the first support beam 37 and having its ends secured to the bottom portions of the support blocks 35 of the head carriage. Each support beam has a length that is generally parallel to the tape travel direction, a width in the direction of a Z axis normal to the plane formed by the X and Y axes, and a thickness in the direction of the Y axis.

The support beams 37, 39 function as a resilient suspension for the magnetic tape head 15, and displacement thereof is achieved by forcing the magnetic tape head to move against the restoring force of the support beams.

The magnetic tape head 15 is secured between the first and support beams 37, 39, generally centrally between the ends thereof, with the first and second support beams being spaced to accommodate the magnetic tape head and mounting components therebetween without bending.

Figure 6:
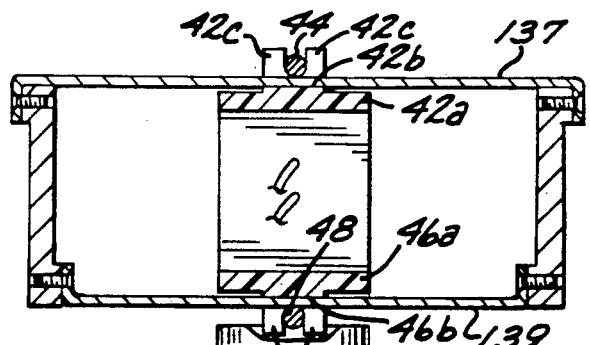
FIG. 6. is an elevational view of the magnetic tape head suspension of the magnetic tape head positioning apparatus of FIG. 4.

As shown more particularly in FIG. 6, the top of the magnetic tape head 15 is secured to the first support beam 37 generally in the center thereof with an assembly comprising a bracket 42 and a pin 44. The bracket 42, which generally resembles an inverted T in cross section, includes a lower panel 42a that is secured to the top of the magnetic tape head 15 with adhesive, for example. A raised rib 42b is narrow in the X-direction and extends laterally relative to the support beam 37 which is secured thereto by adhesive, for example. The bracket 42 further includes upwardly extending tabs 42c at the ends of the raised rib 42b. Semi-circular slots are formed in the tabs 42c to accept the pin 44 which extends laterally across the beam and is secured to the beam and the tabs 42c by adhesive, for example.

The bottom of the magnetic tape head 15 is secured to the second support beam 39, generally in the center thereof with an assembly comprising a bracket 46 and a pin 48, which are similar to the bracket 42 and pin 44 utilized to the secure the top of the magnetic tape head 15 to the first support beam 37. In particular, the bracket 46 is very similar to the bracket 42, but is inverted so as to be secured to the bottom of the magnetic tape head 15. As discussed more fully herein, the tabs 46c of the bracket 46 are configured for the particular implementation.

With the bracket and pin assemblies utilized to secure the magnetic tape head to the parallel support beams, the attachment regions on the support beams are relatively narrow in the X-direction, which allows for more accurate deflection in the center area of the support beams.

Figure 5:
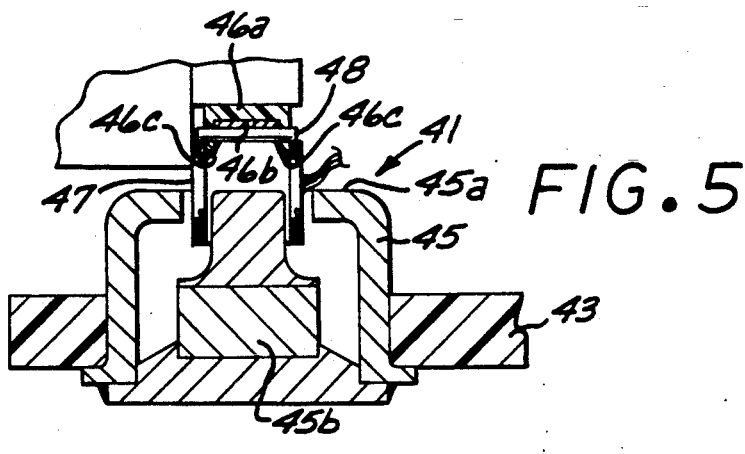
FIG. 5 is detail view of the magnetic tape head positioning linear motor of the magnetic tape head positioning apparatus of FIG. 4.

Referring now in particular to FIGS. 4, 5, and 6, illustrated therein is an illustrative example of a head positioning apparatus in accordance with the invention wherein the magnetic tape head support beams comprise first and second resilient reed or spring beams 137, 139 configured so that their center portions are resiliently deflectable in a direction transverse to the tape travel direction.

For the head positioning apparatus of FIGS. 4, 5, and 6, the head carriage 17 further includes a linear motor 41 supported below the center of the second support reed beam 139 by a motor support member 43 that is integral with the carriage base section 27. The linear motor 41 comprises a voice coil motor that includes an annular pole piece assembly 45 secured to the motor support member 43, and a voice coil 47 secured to the second support reed beam 139 beneath the magnetic tape head 15. The pole piece assembly 45 in particular includes an outer pole piece 45a and an inner pole piece 45b which are separated from each other by an annular gap. The coil 47 is secured to the tabs 46c of the bracket 46 in alignment with the annular gap, and is linearly movable therein along the longitudinal axis of the annular gap which is aligned with the Y axis. As shown in FIG. 6, the inner periphery of the coil 47 is secured, for example by adhesive, to the outer peripheries of the tabs 46c which are curved to generally conform to the inner periphery of the coil 47. The length of the pin 48 is appropriately shorter than the inside diameter of the coil 47.

A servo control signal based on the detected tracking error and generated pursuant to conventional servo techniques is provided to the voice coil 47 which is configured to move in the appropriate direction that will reduce the tracking error.

Figure 7:
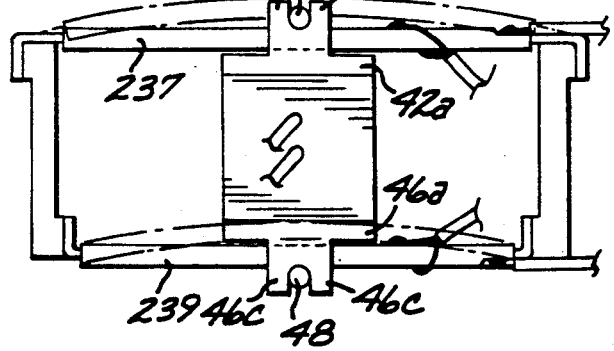
FIG. 7 is an elevational view of a magnetic tape head suspension of a piezoelectric embodiment of the present magnetic tape head positioning apparatus.

In a further embodiment of the invention, the support beams 37, 39 comprise piezoelectric bender beams 237, 239, as schematically shown in FIG. 7. As is well known, a piezoelectric beam can include first and second piezoceramic thin sheets bonded to a thin metal shim sandwiched in the middle. In the bender beams 237, 239 the metal shims extend beyond the piezoceramic layers so that they can be secured to the support arms 39. Application of a control voltage to the bender beams 237, 239 will cause their center portions to deflect in the Y axis direction. In FIG. 7, the piezoelectric bender beams are connected in parallel wherein the piezoceramic layers are commonly connected to one potential of the bias voltage and the metal shim is connected to the other potential of the control voltage.

Figure 8:
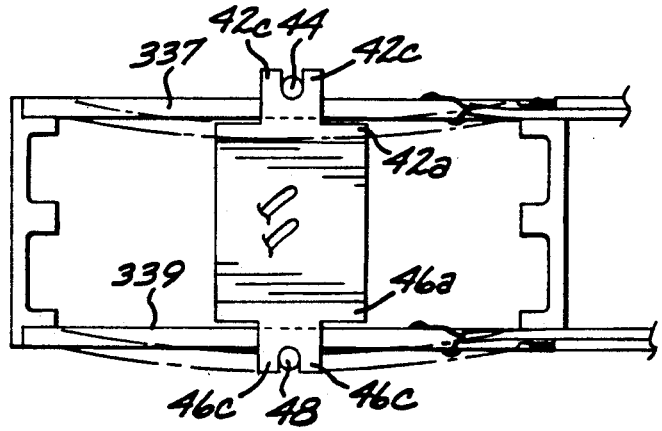
FIG. 8 is an elevational view of a magnetic tape head suspension of a further piezoelectric embodiment of the present magnetic tape head positioning apparatus.

FIG. 8 shows a different configuration of piezoelectric bender beams 337, 339, which by way of further example are connected in series wherein one piezoceramic layer of a beam is connected to one potential of the control voltage and the other piezoceramic layer of the beam is connected to the other potential of the control voltage.

A servo control signal based on the detected tracking error and generated pursuant to conventional servo techniques is provided to the piezoelectric benders which are configured to deflect in the appropriate direction to reduce the tracking error.

Figure 9:
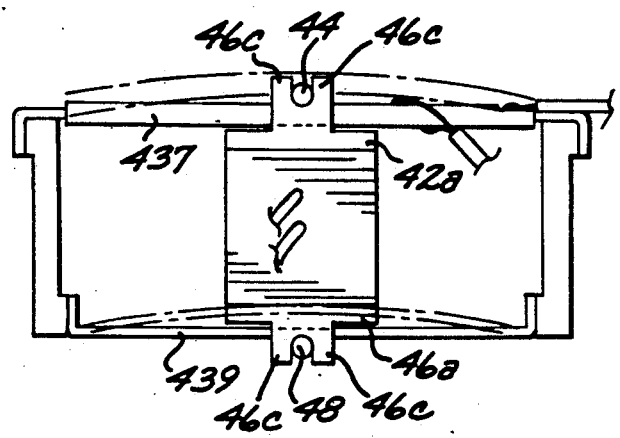
FIG. 9 is an elevational view of a magnetic tape head suspension of another piezoelectric embodiment of the present head positioning apparatus.

Referring now to FIG. 9, shown therein is a further example of a magnetic tape head suspension in accordance with the invention. In this embodiment, the top support beam comprises a piezoelectric bender beam 437, while the lower support beam comprises a reed beam 439. A tracking error signal is provided to the piezoelectric beam 437 which is configured to deflect in the appropriate direction to reduce tracking error.

With the above described magnetic tape head positioning apparatus, very precise head positioning is achieved which provides for more accurate reading of tapes, and which allows for a greater number of tracks on a tape.

Although the foregoing has been a description and illustration of specific embodiments of the invention, various modifications and changes thereto can be made by persons skilled in the art without departing from the scope and spirit of the invention as defined by the following claims.

What is claimed is:

1. In a tape drive having a magnetic head, a head carriage frame, and a coarse positioning mechanism for moving the head carriage frame along a path generally transverse to the direction of tape travel to position the head carriage frame at predetermined coarse positions, a mechanism for fine positioning the magnetic tape head relative to the head carriage frame, comprising:

a resilient support beam for supporting the magnetic tape head generally centrally between its ends which extend beyond the magnetic head and are fixedly and immovably secured to the head carriage frame so that the center portion of the resilient support beam is deflectable relative to the head carriage frame in a direction transverse to the travel direction of a tape in the drive while the ends of the resilient support beam are immovable relative to the head carriage frame; and a piezoelectric bender beam parallel to said support beam for supporting the magnetic tape head generally centrally between its ends which extend beyond the tape head and are fixedly and immovably secured to the head carriage frame so that the center portion of the bender beam is deflectable relative to the head carriage frame in a direction transverse to the travel direction of a tape in the drive while the ends of the bender beam are immovable relative to the head carriage frame, said bender beam deflecting pursuant to a tracking error signal and causing the tape head to move relative to the head carriage frame along a path transverse to the tape travel direction;

whereby the magnetic tape head can be positioned relative to the head carriage by deflection of said piezoelectric bender beam.

2. In a tape drive having a magnetic head, a head carriage frame, and a coarse positioning mechanism for moving the head carriage frame along a path generally transverse to the direction of tape travel to position the head carriage frame at predetermined coarse positions, a mechanism for fine positioning the magnetic tape head relative to the head carriage frame, comprising:

a resilient support beam for supporting the magnetic tape head generally centrally between its ends which extend beyond the magnetic head and are fixedly and immovably secured to the head carriage frame; and a piezoelectric bender beam parallel to said support beam for supporting the magnetic tape head generally centrally between its ends which extend beyond the tape head and are fixedly and immovably secured to the head carriage frame, said bender beam deflecting pursuant to a control signal and causing the tape head to move relative to the head carriage frame along a path transverse to the tape travel direction;

whereby the tape head is positionable relative to the head carriage frame along a path transverse to the tape travel direction pursuant to deflection of said piezoelectric bender beam.

* * * * *